United States Patent [19]

Miller et al.

[11] Patent Number: 4,902,324
[45] Date of Patent: Feb. 20, 1990

[54] METHOD OF REPRODUCIBLY MAKING FIBER OPTIC COUPLER

[75] Inventors: William J. Miller; Carlton M. Truesdale, both of Corning, N.Y.

[73] Assignee: Corning Incorporated, Corning, N.Y.

[21] Appl. No.: 223,423

[22] Filed: Jul. 25, 1988

[51] Int. Cl.$^4$ .................... C03C 25/02; C03B 23/207; C03B 37/027
[52] U.S. Cl. ...................... 65/3.11; 65/4.21; 350/96.15
[58] Field of Search .............. 65/3.11, 3.2, 4.2, 4.21, 65/4.3, 109, 110; 350/96.15

[56] References Cited

U.S. PATENT DOCUMENTS

| | | | |
|---|---|---|---|
| 3,579,316 | 5/1971 | Dyott et al. | 65/4.21 |
| 4,291,940 | 6/1977 | Kawasaki et al. | 65/4.2 |
| 4,377,403 | 3/1983 | McLandrich | 65/3.11 |
| 4,392,712 | 7/1983 | Ozeki | 350/96.15 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.16 |
| 4,490,163 | 12/1984 | Jochem et al. | 65/4.2 |
| 4,591,372 | 5/1986 | Bricheno et al. | 65/4.2 |
| 4,726,643 | 2/1988 | Imoto et al. | 350/96.21 |

FOREIGN PATENT DOCUMENTS

59-195615 11/1984 Japan ..................... 65/3.11
60-140208 7/1985 Japan .

Primary Examiner—Kenneth M. Schor
Assistant Examiner—John J. Bruckner
Attorney, Agent, or Firm—William J. Simmons, Jr.

[57] ABSTRACT

A fiber optic coupler is formed by providing a glass tube having a longitudinal aperture extending therethrough. Glass optical fibers, each having a core, cladding and coating are disposed within the longitudinal aperture, the fibers extending beyond each end thereof. The coating is removed from that portion of the fibers in the midregion of the tube but remains on that portion of the fibers extending into the ends of the apertures. The aperture is formed by a plurality of flattened walls, the dimensions and orientations of which are such that the cross-section of the aperture in the central region of the tube is symmetrical with respect to a plane passing through the longitudinal axis of the tube. At any cross-section of the aperture that is adjacent the coated regions of the fibers, each fiber coating contacts two walls of the aperture. The fibers are held taut to effect a tension therein, and the midregion of the tube is heated, collapsed about the fibers, and drawn to reduce the diameter thereof over a predetermined length.

10 Claims, 4 Drawing Sheets

METHOD OF REPRODUCIBLY MAKING FIBER OPTIC COUPLER

CROSS-REFERENCE TO RELATED APPLICATION

This application is related to U.S. patent application Ser. No. 204,620 entitled "Method of Making an Economical Fiber Coupler" (G. E. Berkey) filed June 9, 1988.

BACKGROUND OF THE INVENTION

Certain types of fiber optic systems require couplers in which at least a portion of the light propagating in an optical fiber is coupled to one or more output fibers. The present invention relates to such fiber optic couplers and more particularly to a cost effective and reproducible method of making such fiber optic couplers.

It has been known that coupling occurs between two closely spaced cores in a multiple core device. The coupling efficiency increases with decreasing core separation and, in the case of single-mode cores, with decreasing core diameter. Couplers based on these principles have been developed for such uses as WDM couplers, star couplers, bend and Mach-Zehnder switches and power splitting couplers such as 3 dB couplers. Such couplers are capable of low loss operation; they typically exhibit an excess loss of about 1 dB or less.

Multimode and single-mode couplers have been formed by positioning a plurality of fibers in a side-by-side relationship along a suitable length thereof and fusing the claddings together to secure the fibers and reduce the spacings between the cores. Coupling can be increased by stretching and by twisting the fibers along the fused length thereof as taught in U.S. Pat. No. 4,426,215 to Murphy; however, twisting the fibers is disadvantageous for certain purposes. Also, a portion of the cladding is sometimes removed by etching or grinding to decrease the intercore distance as taught in U.S. Pat. No. 4,449,781 to Lightstone et al. Since the coupling region is fragile and is exposed to the atmosphere, such couplers must then be provided with a hermetic enclosure. These processes are labor intensive and therefore expensive. Furthermore, they do not always result in couplers exhibiting predetermined desired coupling characteristics and long term integrity. Such disadvantages are particularly apparent in the manufacture of certain single-mode couplers wherein the coupling core sections are to remain parallel to each other to insure that the propagation constants are matched and in the manufacture of certain single-mode couplers which must possess optical characteristics such as polarization retention.

An already formed coupler does not have to be immediately provided with an enclosure if the process of forming the coupler inherently hermetically seals and adequately supports the coupling of the fibers. However, attempts to accomplish this result have resulted in the formation of couplers having undesirable optical characteristics.

Japanese published application 60-140208 teaches a coupler formed by pre-twisting a pair of fibers, inserting them into a quartz tube, and heating and drawing the central part of the tube to reduce its diameter. Resin is then applied to the ends of the tube to seal the fibers thereto. This coupler has the following disadvantages. During the collapse of the tube onto the fibers, the fibers are not held taut and the capillary tube is not evacuated. The fibers are therefore free to meander in the tube, thereby preventing the achievement of a predetermined coupling when the tube is elongated by a predetermined length. This can also make it difficult to achieve low coupler loss. Since the fibers are pre-twisted in order to provide a sufficient length of fiber-to-fiber contact to provide adequate coupling, the resultant coupler cannot maintain the polarization of an input optical signal and is unsuitable for certain applications.

U.S. Pat. No. 3,579,316 to Dyott et al. teaches a method wherein the fibers are first inserted into a capillary tube where the ends may overlap. The capillary tube is formed of a glass having a refractive index lower than that of the fiber cladding material. Heat is applied to the capillary tube in the vicinity of the fiber overlap, and the tube is stretched until the diameter thereof approximates that of the original fibers. The original cores of the pulled out part become vanishingly small, their stretched diameters being only about 1/100 the original diameters; the cladding of the original fibers becomes the core of the coupling section. In a second embodiment, wherein there is a partial transfer of power from one fiber to the other, the two fibers are inserted into the tube with their ends extending from both tube ends. The bore of the capillary tube is sufficiently large that one of the fibers is surrounded by a sleeve having the same refractive index as the capillary tube. Since the cores become vanishingly small and the original claddings become the cores of the coupler section, the sleeve keeps the new cores a fixed distance apart. Such a long thin coupler is very cumbersome and fragile. Furthermore, such a coupler is lossy since the original cladding takes the place of the vanished cores. In the region of the coupler where the fiber cores taper from their "vanishingly small" size to their full size, an insufficient amount of power is transferred from the cladding back to the core.

Various disadvantages of the aforementioned prior art have been overcome by the method of said related application Ser. No. 204,620 wherein at least two suitably prepared glass optical fibers, each having a core and cladding, are disposed within the longitudinal aperture of a glass tube in a manner such that the ends of the fibers extend beyond the ends of the tube. If the glass fibers have a coating thereon, a portion of the coating intermediate the ends thereof is removed, the uncoated portion of the glass fibers being disposed within the longitudinal aperture of the tube. The fibers are held taut and are glued to the first and second end portions of the tube; after the glue has cured, the fibers remain in tension. The midregion of the assembly so formed is heated to cause it to collapse around the fibers, and it is drawn down to a predetermined diameter. Collapse of the tube is facilitated by creating a lower pressure within the aperture.

As the central portion the glass tube collapses, the aperture decreases in size, and the tube contacts the fibers, thereby tending to force them into mutual contact. This occurrence increases the probability that the resultant coupler will possess predetermined coupling characteristics. However, glass from the collapsing tube can also flow into the region between the fibers. If this flow predominates, it can cause a separation between the fibers which affects coupling.

SUMMARY OF THE INVENTION

It is therefore an object of the present invention to provide a method that overcomes the disadvantages of the prior art. A further object is to provide a method of making optical couplers, the optical properties of which closely conform to predetermined values. A further object is to provide a method of making optical couplers that are capable of withstanding environmental abuses such as temperature changes and mechanical influences and yet effect a reliable and predictable transfer of energy between adjacent fibers.

Briefly, the present invention relates to a method of making a fiber optic coupler. There is provided a glass tube having first and second end portions and a midregion. Extending through the tube is a longitudinal aperture that is formed of n flattened surfaces, wherein n is at least 3. The cross-sectional configuration of the aperture is symmetrical about a plane through the longitudinal axis of the tube. The aperture cross-section may be diamond-shaped, square-shaped or the like. At least two glass glass optical fibers, each having a core and cladding, are disposed within the longitudinal aperture, the fibers extending beyond each of the ends of the tube. The fibers are held taut to effect a tension therein. The midregion of the tube is heated, and it is collapsed around the fibers, at least a portion of the midregion being drawn to reduce the diameter thereof and to reduce the spacing between the fiber cores.

The step of heating to collapse and stretch may comprise heating the central portion of the tube to at least the softening point of the material thereof to collapse the central portion around the fibers, thereby forming a solid midregion, and thereafter heating at least a portion of the solid midregion to at least the softening points of the materials of the glass fibers and the tube and drawing at least a portion of the midregion.

The step of holding the fibers taut may comprise securing to a point remote from the tube one end of each of the fibers that extends from the first end of the tube. Thereafter, the remaining ends of the fibers that extend from the second end of the tube are pulled to apply a tension to the fibers, and the remaining end of each of the fibers is also secured to a point remote from the tube.

If the glass fibers have coatings thereon, the method further comprises the step of stripping from each fiber a portion of the coating intermediate the ends thereof, the lengths of the fibers from which coatings have been stripped being shorter than the length of the aperture. The uncoated portions of the fibers within the longitudinal aperture are disposed such that the coated portions of the fibers contact the end regions of the aperture and are thereby precisely positioned.

After the midregion has been stretched, the tube can be heated at the uncollapsed portions of the aperture and glue can be applied to the ends of the tube aperture so that the glue is drawn into the aperture and onto the stripped portions of the fibers as the tube cools.

If the aperture has n flattened surfaces wherein n is at least 3, n+1 optical fibers can be disposed in the aperture, n of the fibers contacting the tube and one of the fibers being centrally disposed in the aperture in contact with the n fibers.

BRIEF DESCRIPTION OF THE DRAWINGS

It is noted that the cross-sectional illustrations of FIGS. 10-15 are taken at that region of the capillary tube in the vicinity of lines A—A of FIG. 3.

DESCRIPTION OF THE PREFERRED EMBODIMENTS

The drawings are not intended to indicate scale or relative proportions of the elements shown therein.

The present invention relates to an improved method of making optical fiber couplers by disposing within the longitudinal aperture of a glass tube at least two suitably prepared glass optical fibers, each having a core and cladding. If the optical fibers have a coating thereon, a portion of the coating intermediate the ends thereof is removed, and the uncoated portion of the fibers is placed within the aperture. The fibers are held taut to effect a tension therein. The inside of the assembly so formed may be cleaned by applying a vacuum to one end thereof and flowing through the aperture a suitable fluid such as air or a liquid cleaning solution. The midregion of the assembly so formed is heated to cause it to collapse around the fibers, and it is stretched or drawn down to a predetermined diameter. Collapse of the central portion the tube can be facilitated by creating a differential pressure across the tube wall, the lower pressure being within the aperture; this assists in the formation of a solid midregion.

The fibers may be held taut during the collapse step by affixing them to one end portion of the tube, pulling the fibers that extend from the aperture at the second end of the tube to apply a tension thereto, and affixing the fibers to the second end portion of the tube. The fibers may be affixed to the tube end portions by applying thereto a glue which may consist of any bonding material such as cement, adhesive or the like, UV curable epoxy being preferred. The glue may be applied to less than the entire circumferential region around the fibers, thereby leaving an opening between the aperture and the glue, whereby access to the aperture is retained at that end of the tube. Other techniques for gluing the fibers to the tube ends are taught in said related patent application Ser. No. 204,620.

Although low loss couplers have been made by collapsing the tube onto the fibers and drawing or stretching the midregion of the tube in a single heating operation, it is advantageous to separately perform these steps. If the tube is allowed to cool prior to heating it for the stretching operation, more control can be exerted over each step. A central portion of the solid collapsed midregion can be stretched, thereby keeping the stretched portions of the optical fibers completely enclosed in the matrix glass of the tube. This improved hermeticity is advantageous since it prevents the stretched portions of the fibers from being adversely affected by water and other contaminants that can adversely modify the optical characteristics of the coupler.

Figure 1:
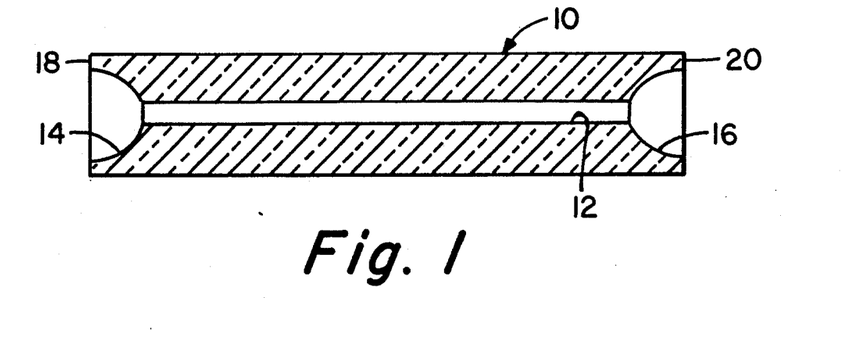
FIG. 1 is a cross-sectional view of a glass tube suitable for the purposes of the present invention.

Preferred for use in the method of the present invention is tube 10 (FIG. 1) having a longitudinal aperture 12. Tube 10 may comprise a capillary tube formed as hereinafter described in detail or as taught in copending U.S. patent application entitled "Capillary Splice and Method", Ser. No. 082,680, filed on Aug. 7, 1987, which application is incorporated herein by reference. Tapered apertures 14 and 16 form funnel-like entrances to longitudinal aperture 12 at end surfaces 18 and 20, respectively. The tapered apertures facilitate the insertion of fibers into aperture 12, since the maximum cross-sectional dimension thereof may be less than 400 μm. Tapered apertures 14 and 16 also facilitate the application of glue to the fibers in such a manner that the aperture is not blocked thereby.

The softening point temperature of tube 10 should be lower than that of the fibers that are to be inserted therein. Suitable tube compositions are $SiO_2$ doped with 1 to 25 wt. % $B_2O_3$ and $SiO_2$ doped with 0.1 to approximately 2.5 wt. % fluorine. A preferred composition is borosilicate glass comprising $SiO_2$ doped with 8–10 wt. % $B_2O_3$. In addition to lowering the softening point temperature of $SiO_2$, $B_2O_3$ and F also advantageously decrease the refractive index thereof.

For a coupler manufacturing process to consistently produce couplers having predetermined optical characteristics, all of the process steps, including the step of inserting the fibers into the capillary tube should be uniformly performed on each coupler made. It is advantageous to employ a fiber insertion station which meets the following criteria. It is noted that for certain types of coupling devices, such as WDM couplers and polarization retaining couplers, the fibers must be kept untwisted and must be maintained parallel to one another. To keep the fibers untwisted and straight, the apparatus which holds the fibers should be properly aligned. Means should be provided for holding the fibers under a slight tension during the gluing step to eliminate the occurrence of fiber slack or sag during further processing steps, especially during the step of collapsing the capillary tube onto the fibers. The occurrence of slack in one or both of the fibers during the tube collapse step could cause the resultant device to exhibit an excessive loss and/or could cause variations in the coupling ratio. The area around the station should be free from excessive dust and other particulates that could be drawn into the capillary tube and lodged inside, since seeds could result from such particulate matter during the collapse and redraw steps. The excessive attenuation that can result from such seeds could render the coupler useless.

Figure 2:
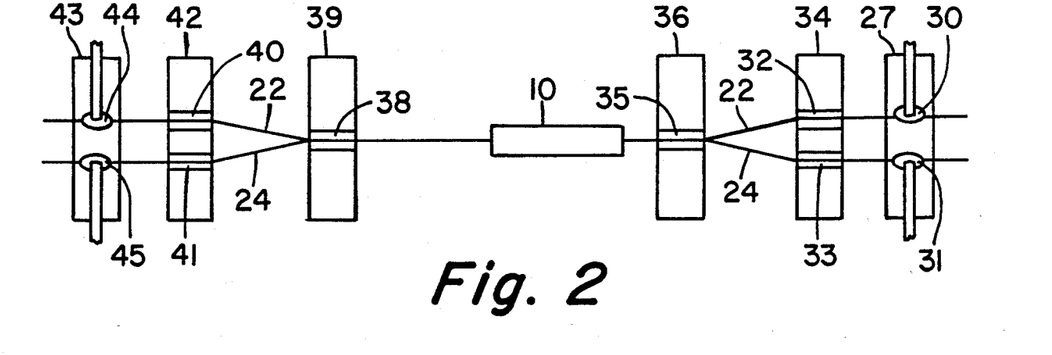
FIG. 2 is a schematic illustration of an apparatus for inserting fibers into the tube.

A suitable fiber insertion station, which is shown in FIG. 2, comprises aligned blocks 27, 34, 36, 39, 42 and 43. Rubber surfaced clamps 30 and 31 are capable of retaining optical fibers against block 27. Similar clamps 44 and 45 are associated with block 43. The clamps, which are spring biased against the blocks, can be withdrawn from contact with the blocks by depressing a handle connected thereto. Block 34 contains spaced grooves 32 and 33 that are aligned with grooves 40 and 41 of block 42. A single groove 35 in the surface of block 36 is aligned with similar groove 38 of block 39. The illustrated grooves may be U-shaped and may have a width that is just sufficient to slidingly accommodate the fiber or fibers that are situated therein.

The operation of the fiber insertion station of FIG. 2 is as follows, reference being made to the capillary tube illustrated in FIGS. 3 and 4. Two lengths 22 and 24 of coated optical fiber are severed from a reel of fiber. The fiber lengths should enable each fiber to extend beyond each end of the tube a sufficient distance to make connection thereto, a total fiber length of 2 meters having been found to be sufficient. An end of each of fibers 22 and 24 is secured by clamps 30 and 31, respectively. The entire lengths of the fibers are wiped with a lintless cloth dampened with a suitable cleaning solution such as ethyl alcohol.

The aperture of capillary tube 10 is preferably just large enough to accept the coated portions of the optical fibers, and the shape thereof should be non-circular as described below. Such a relationship between the coated fibers and the aperture prevents the ends of the fibers from twisting within the tube. As illustrated in FIG. 4, certain hole cross-sectional shapes such as diamond, square and the like facilitate the proper alignment of the fibers in the tube. The aperture diameter should not be so small that it is difficult to thread the fibers therethrough, since this could cause the coating to smear on the inside of the tube. The smeared region of the tube could cause the resultant coupler to contain seeds that would degrade the coupler's performance. In order to facilitate easy movement of the tube along the fibers, a small amount of ethyl alcohol may be squirted into the tube. This functions as a temporary lubricant which will readily evaporate. The capillary tube is threaded onto the fibers and moved to approximately the position shown in FIG. 2 adjacent block 36. The fibers are pulled slightly so that they are under some tension, and the remaining ends thereof are then restrained by clamps 44 and 45. A mechanical stripping tool is utilized to remove a portion of the coating from each fiber at a location thereon between tube 10 and block 39. The length of the stripped section of fiber is slightly shorter than the length of the capillary tube aperture to allow the coating to extend into both ends of aperture 12, thereby properly positioning the fibers within the aperture cross-section. This protrusion of the fiber coating is illustrated in FIG. 3. The lengths of the stripped regions should be about equal, and those regions should be adjacent one another.

Using a dampened lintless cloth, the two fibers are grasped at the left end of tube 10 and are wiped firmly, the cloth being moved away from the tube and across the stripped regions. This step removes any loose material generated by the coating stripping step and leaves a pristine surface on the stripped regions of the fibers. The fibers are then placed into grooves 35 and 38 which help to hold the fibers straight and adjacent one another. Clamp 44 is released and then reclamped after fiber 22 has been retensioned; fiber 24 is then similarly retensioned.

Figure 3:
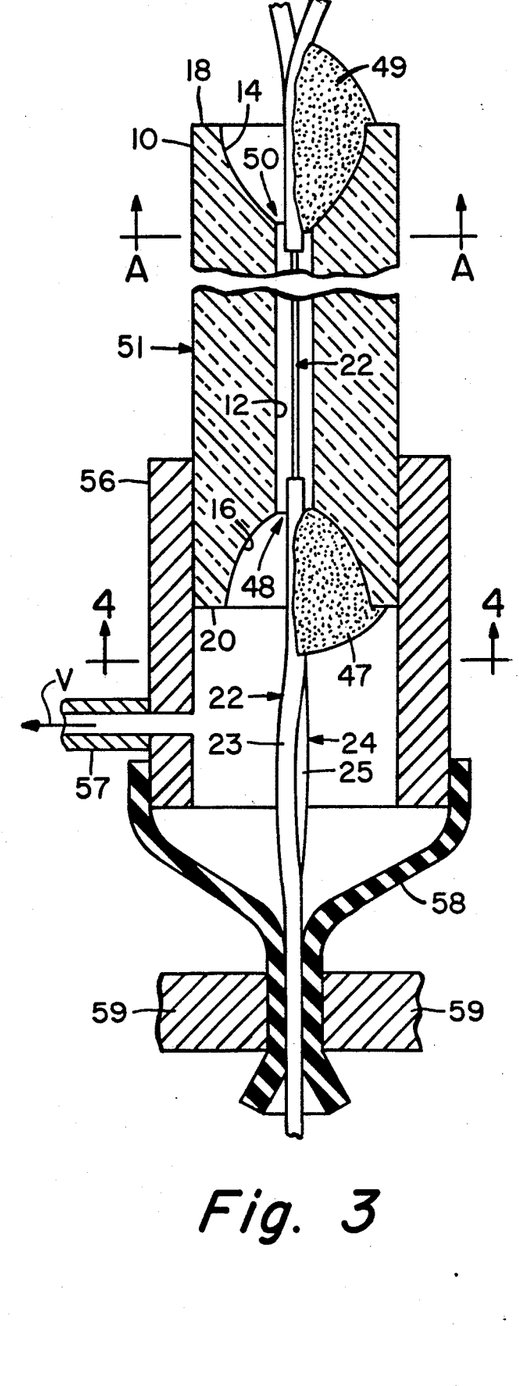
FIG. 3 is a cross-sectional view illustrating a method of providing access to the tube aperture, and in addition, illustrates a method of evacuating the tube.
Figure 4:
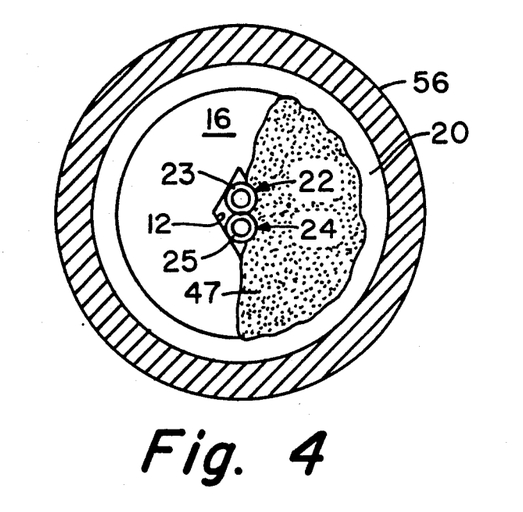
FIG. 4 is a cross-sectional view taken along lines 4—4 of FIG. 3.

The capillary tube is moved toward block 39 and positioned such that it is centered over the stripped region as shown in FIG. 3. A small amount 47 of glue is applied to one side of fibers 22 and 24 to attach them to one side of tapered aperture 16' while leaving an opening 48 which permits access to longitudinal aperture 12 between glue 47 and the remainder of the tapered aperture 16. A drop 49 of glue is similarly applied between the fibers and tapered aperture 14, leaving aperture access opening 50 between glue 49 and tapered aperture 14. Depending upon the size of the capillary tube aperture, it can be difficult or even impossible to glue the fibers to the tube end portions without blocking the aperture unless the tube is provided with tapered apertures 14 and 16. Openings 48 and 50 permit the flow of fluid through aperture 12 during the final wash, and also permit the evacuation of aperture 12 during the collapse of tube 10. If the glue is a UV light curable epoxy, UV light is directed on the first applied drop of epoxy to cure it before the second drop is applied to the remaining end. After the second drop is applied, it is cured by UV light.

The pigtails or sections of fiber extending from the ends of tube 10 can be color coded. At this time the fibers within the capillary tube are visually checked for internal twists. A twist of more than 180° can be seen by the naked eye. Also, a laser beam can be launched into that end of fiber 22 protruding from clamp 44. If there is no twist present, the light emanates from that end of fiber 22 protruding from clamp 30. An orientation mark can be placed on the upper surface of tube 10 so that the fibers can be oriented in the same manner with respect to the draw apparatus for each coupler that is made, thereby ensuring every coupler preform is subjected to uniform process conditions.

In accordance with one embodiment of the present invention, tube 10 is heated and collapsed onto fibers 22 and 24, and thereafter, the midregion of tube 10 is heated and stretched to bring the fiber cores closer together along a distance sufficient to accomplish a predetermined type of coupling.

Figure 5:
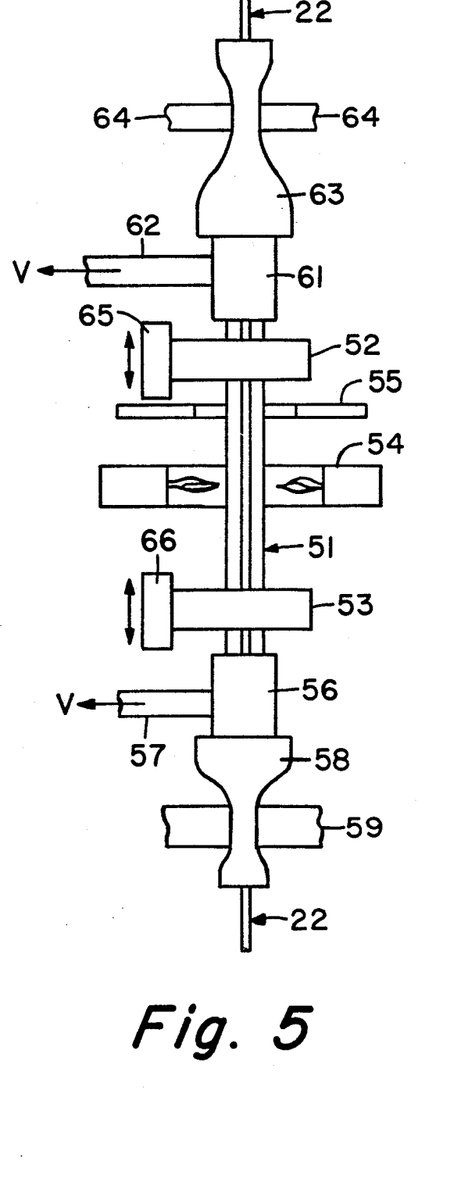
FIG. 5 is a schematic illustration of an apparatus for collapsing the tube and drawing the midregion thereof.

A preferred apparatus for performing the tube collapsing and stretching steps is shown in FIG. 5. Chucks 52 and 53, which are used to secure the coupler preform in this apparatus, are mounted on motor controlled stages 65 and 66, respectively, which are preferably controlled by a computer. Symmetry is an important requirement for the collapse and stretch steps; therefore, chucks 52 and 53 must be aligned to prevent the occurrence in the coupler of an offset which can adversely affect device loss and which can also adversely affect coupler bidirectionality, that characteristic whereby coupler output performance is substantially uniform regardless of which end of a fiber is selected as the input port. Coupler bidirectionality is also enhanced by locating the burner centrally along the coupler preform so that it heats the preform evenly. A symmetrically designed burner such as ring burner 54 is suitable for evenly heating the capillary tube midregion. Heat shield 55 protects the apparatus located above the burner.

Coupler preform 51 of FIG. 3 is inserted through ring burner 54 with the orientation mark facing a predetermined direction. The preform is clamped to the draw chucks, and vacuum attachments 56 and 61 are attached to the ends thereof. Vacuum attachment 56, which is shown in cross-section in FIG. 3, may comprise a short, somewhat rigid section of rubber tube having a vacuum line 57 extending radially therefrom. One end of a length of thin rubber tubing 58 is attached to that end of vacuum attachment 56 that is opposite preform 51; the remaining end of the tubing extends between clamp jaws 59. Upper vacuum attachment 61 is similarly associated with line 62, tubing 63 and clamp jaws 64. Fibers 22 and 24 extend from tubing 58 and 63.

Vacuum is applied to the lower portion of coupler preform 51 for a time sufficient to wash aperture 12 by clamping jaws 59 on tubing 58. The upper line is vented to air during this time by leaving clamp jaws 64 open. This "air wash" pulls from aperture 12 any loose debris which has accumulated therein during the fiber insertion step. Jaws 64 are then clamped against tubing 63 to apply vacuum to the upper portion of preform 51.

Figure 6:
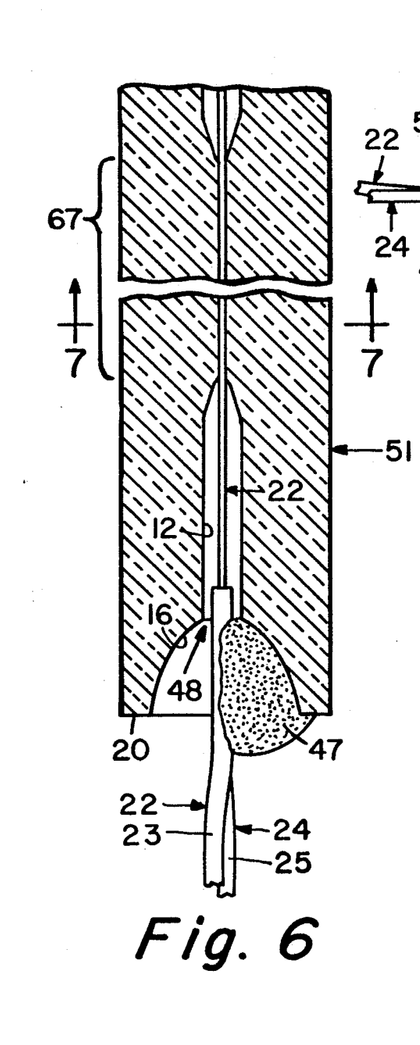
FIG. 6 is a cross-sectional view illustrating the collapse of the glass tube around the fibers to form a solid midregion.
Figure 7:
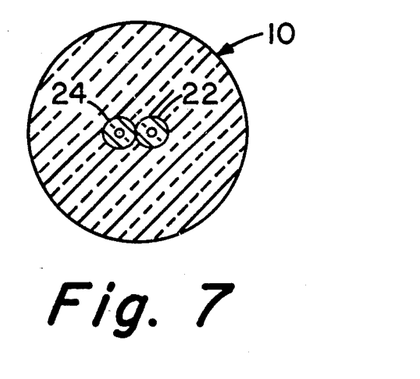
FIG. 7 is a cross-sectional view through the solid midregion of FIG. 6 along lines 7—7.

The capillary tube collapse step involves heating the coupler preform with the flame from ring burner 54 for a short period of time, typically about 25 seconds, to increase the temperature of midregion 67 of the tube to the softening temperature thereof. With the assistance of the differential pressure on the tube, the matrix glass collapses onto the fibers 22 and 24 and urges them into mutual contact. The tube matrix glass surrounds the fibers and fills the aperture to form a solid structure as shown in FIGS. 6 and 7. The portion described as midregion 67, which forms the coupling region of the resultant coupler, becomes a solid region that is preferably free of air lines, bubbles, or the like. The longitudinal length of the region that is to be collapsed is determined by the temperature and time duration of the flame, the thermal conductivity of the glass tube, and the amount of vacuum applied. The use of vacuum during collapse causes the tube to collapse before the fibers can soften, thereby preventing or reducing fiber distortion and improving reproducibility. The fibers also tend to remain circular in cross-section when the softening point temperature thereof is greater than that of the tube.

The central portion of the collapsed midregion of the tube can be stretched without removing the device from the apparatus in which the tube was collapsed. After the tube cools, the flame is reignited, and the center of the collapsed region is reheated to the softening point of the materials thereof. The flame duration for the stretch process, which depends upon the desired coupler characteristics, is usually between 10 and 20 seconds. The shorter heating period for the stretch step results in a stretched region that is shorter than the collapsed region. If the entire midregion were stretched, the end portion of the light coupling region of the fibers could be exposed to the aperture. Stretching only the central portion of the collapsed midregion ensures that the coupling region of the fibers will be embedded in the matrix glass of the capillary tube. During this reheating step, the fibers are also heated since they are completely surrounded by the matrix glass of the capillary tube and are therefore in thermal contact therewith. After the collapsed tube is reheated, the flame is extinguished and stages 65 and 66 pull in opposite directions until the coupler length has been increased by a predetermined amount. If properly aligned apparatus is employed and if the process parameters are carefully controlled, all couplers formed by the process will possess similar optical characteristics. The diameter of midregion 67 is reduced as illustrated by region 68 of FIG. 8. The diameter of drawn down region 68 depends upon various fiber and operational parameters. The ratio of the drawn down diameter of region 68 to the starting diameter of midregion 67 (the draw down ratio) is determined by the optical characteristics of the particular device being made. It is well known that such draw down ratios are a function of the ratio of the signal split between the fibers, the refractive index difference between the tube and the fiber cladding, the outside diameter of the fiber cladding, the diameter of the fiber core, signal operating wavelength, cutoff wavelength, the tolerable excess loss, and the like. A preferred range of draw down ratios is between about ½ to 1/20; however, couplers can be made having draw down ratios outside this range.

The amount of stretching to which the capillary tube must be subjected to achieve a given type of coupler is initially determined by injecting light energy into one input fiber of a collapsed coupler preform and monitoring the output power at the output fibers during the stretch operation. To accomplish this purpose, one of the fiber pigtails is aligned with a light source, and both pigtails at the other end of the device are coupled to light detectors. The predetermined ratio of the dynamic output powers can be used as an interrupt to cause stages 65 and 66 to stop pulling the sample. After having determined the proper stretching distance to achieve predetermined coupling characteristics, the apparatus can be programmed to move the stages that proper stretching distance during the fabrication of subsequent couplers that are to have said predetermined characteristics.

It is conventional practice to monitor output signals to control process steps in the manufacture of optical devices as evidenced by U.S. Pat. Nos. 4,392,712 and 4,726,643, U.K. patent application No. GB 2,183,866 A and International Publication No. WO 84/04822. Furthermore, computers are often employed to in feedback systems which automatically perform such monitor and control functions. A suitably programmed PDP 11-73 micro-computer can be utilized to perform these functions. The timing sequences that have been used in the fabrication of a particular type of coupler can be entered in a separate multiple command file that the computer recalls at run-time. The collapse and stretch steps that are required to make that particular coupler can be executed in succession by the computer on each coupler preform to reproducibly manufacture couplers. The process parameters that can be controlled by the computer to ensure coupler reproducibility are heating times and temperatures, flow rates of gases, and the rate at which the stages pull and stretch the coupler preform. Reproducibility is also a function of the resolution of stages 65 and 66.

The vacuum lines are removed from the resultant coupler, and quantities 54 and 56 of glue are applied to the ends of the capillary tube where they flow at least partially into the longitudinal aperture by capillary action. This produces a hermetic seal and also increases the pull strength of the devices. The resulting assembly comprises fiber optic coupler 52 of FIG. 8 which functions to couple a signal in optical fiber 22 to optical fiber 24 and vice versa. The coupler is then removed from the draw apparatus and can be packaged if additional stiffness is desired.

Figure 8:
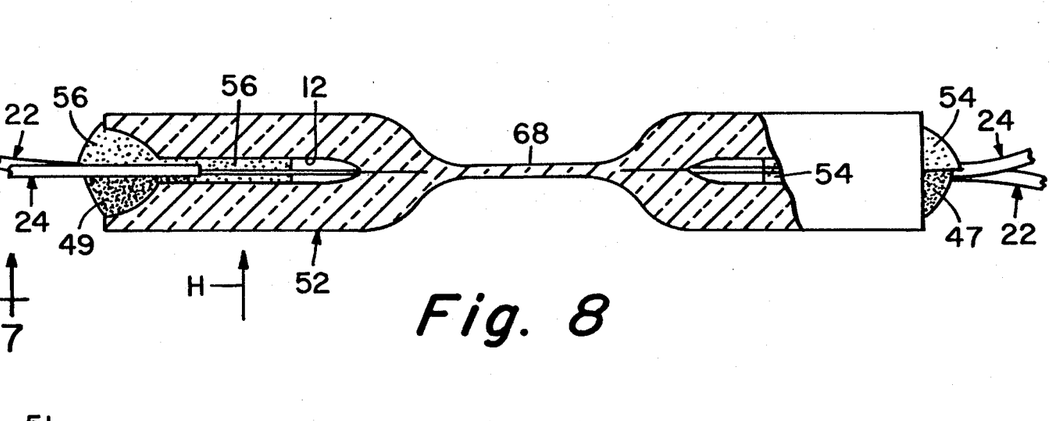
FIG. 8 is a cross-sectional illustration of the fiber coupler of the present invention after it has been drawn down and sealed at its ends.

A preferred method of applying glue to the coupler is illustrated in FIG. 8 wherein arrow H indicates the local application of heat to that portion of the coupler adjacent the central region of an open portion of aperture 12. For example, a pencil flame could be directed to that region of the coupler. Glue 56 is preferably applied to the coupler prior to the application of heat H. As the air within the aperture becomes heated, it expands and is driven from the aperture. This occurrence is manifested by the appearance of one or more bubbles in the liquid glue. The flame is removed, and the glue is drawn into the aperture as the remaining air cools. The glue is then cured. The fiber pigtails have improved pull strength since the glue extends over the bared portions thereof. The gluing technique would not be as effective if the glue were applied after the local heat source H had been applied to the tube and was removed.

In accordance with the above-described embodiment, the tube is allowed to cool prior to heating it for the stretching operation in order to provide more control over each step. This enables the stretching of a central portion of the solid collapsed midregion, thereby keeping the stretched portions of the optical fibers completely enclosed in the matrix glass of the tube. This improved hermeticity is advantageous since it prevents the stretched portions of the fibers from being adversely affected by water and other contaminants that can adversely modify the optical characteristics of the coupler.

Low loss couplers have also been made by an alternative embodiment wherein the steps of collapsing the tube onto the fibers and drawing or stretching the midregion of the tube are performed in a single heating operation. In accordance with this modified embodiment, the fibers are inserted into the capillary tube and are glued taut to the ends thereof such that there are access openings to the aperture. This assembly is placed in a glass working lathe, and a flame is applied to a small portion of the midregion until the softening point of the materials is reached, and the heated section is stretched. For a given amount of coupling, the amount of tube elongation is greater in this embodiment than in that embodiment wherein the tube collapse and the midregion stretching steps are separately performed. Finally, glue is applied to the ends of the device to close the openings to the aperture.

The disadvantages of this embodiment are a reduction in hermeticity and an adverse affect on manufacturing reproducibility, i.e. stretching to a predetermined length does not always result in the desired coupling characteristics. However, this embodiment has some advantages over other methods. The method is simpler in that it can be performed without vacuum and the separate tube collapse step is eliminated. Low loss couplers have been formed by this method, device losses as low as 0.05 dB at 1300 nm having been measured.

Figure 9:
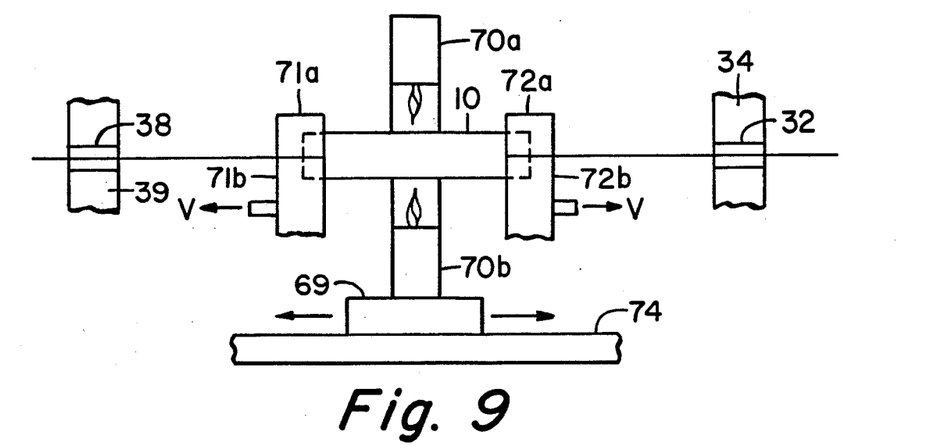
FIG. 9 is a schematic illustration of an apparatus for holding the fibers while the tube is being collapsed.

It is not necessary to glue the fibers to the capillary tube to tension the fibers during the step of collapsing the capillary tube thereon or during the step of stretching the tube-fiber combination (if no separate collapse step is used). An alternative embodiment employs the apparatus of FIG. 2, as described above, and further employs a split ring burner 70a, 70b which is shown in FIG. 9. The fibers are threaded through tube 10, stripped and cleaned, and the stripped portion thereof is centered in the tube. During these initial steps, portion 70a of the ring burner is retracted from portion 70b and base 69 is remotely located with respect to tube 10. After the fibers are tensioned as described in conjunction with FIG. 2, tube 10 is centered between blocks 36 and 39, and vacuum chucks 71 and 72 are attached to the tube end portions. Vacuum chucks 71 and 72 are split into sections a and b so they can be applied to the end portions with the fibers extending therethrough. Burner base 69 then traverses track 74 until burner portion 70b is adjacent the center of the tube midregion. Burner portion 70a is then joined to portion 70b. Burner 70 heats the tube midregion which then collapses as described above. The remaining coupler-forming steps can be performed at the apparatus shown in FIG. 9 or in a different apparatus as described above.

The geometry of the tube aperture is a critical factor in maintaining the fibers in mutual contact and absolutely free from any twist. Apertures having non-circular cross-sections are preferred since they can restrict the location of the fibers with respect to the aperture walls by contacting the fiber coating at more than one point around the periphery thereof. That is, such apertures allow only a limited number of fiber positions, and after the coated regions of the fibers have been positioned in the ends of the aperture, the fibers cannot rotate out of their initial positions. To illustrate this point reference is made to FIG. 10 wherein optical fibers 76 and 77 having coatings 78 and 79, respectively, are disposed within aperture 80. Regardless of the aperture geometry, it is preferred that the size thereof be no larger than that size which is barely sufficient to receive the coated fibers without causing the coating material to smear onto the aperture surface. Excessive aperture size has been found to cause macrobend loss and/or twisting of fibers. Aperture size is thus determined by the fiber coating diameter and the number of fibers that are to be employed. Such a fit ensures that each coated fiber located at the periphery of the aperture contacts the aperture cross-section at the maximum possible number of points. For example, coatings 78 and 79 contact aperture 80 at points a and b, respectively. It is noted that one contact point per fiber is insufficient to prevent the coated fibers from rotating in a random fashion as indicated by arrows 81 so that the bared sections of fiber can become slightly twisted. It is noted that when the fiber coatings are in contact with the aperture walls as shown in FIG. 10, for example, the glass fibers themselves are initially separated in the tube collapse region, and they remain separated until the tube walls begin to collapse onto the fibers and urge them together.

Figure 10:
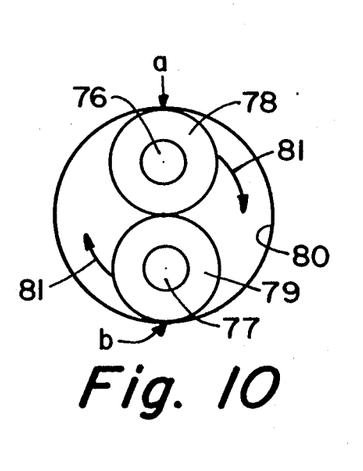
FIGS. 10 and 11 illustrate aperture cross-sectional shapes that can introduce adverse effects in the tube collapse process.
Figure 11:
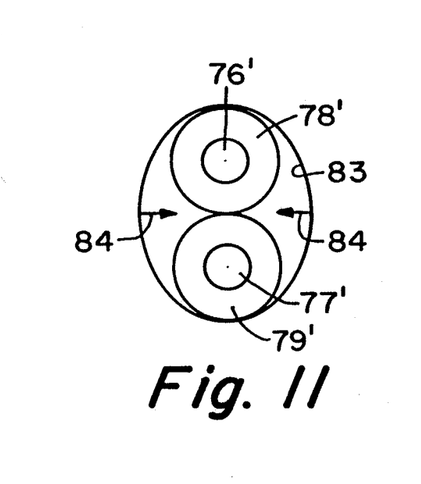
Figures 12, 15:
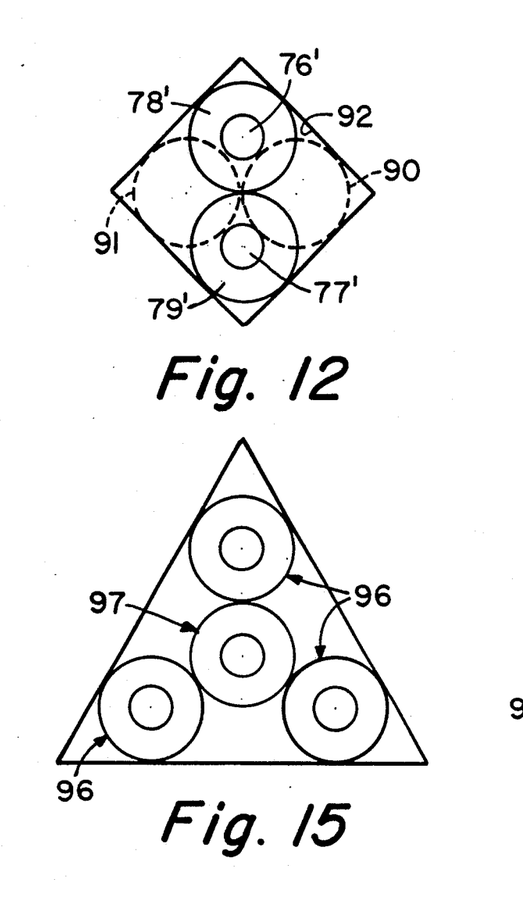
FIGS. 12-15 illustrate aperture cross-sectional shapes in accordance with the present invention.
Figure 13:
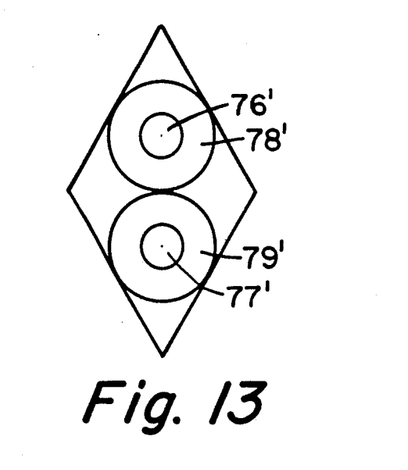

Other aperture cross-sections are shown in FIGS. 11–13 wherein elements which are similar to those of FIG. 10 are represented by primed reference numerals. Elliptically-shaped aperture 83 of FIG. 11 has the advantage of restricting the orientation of the coated fibers. However, a possible problem resulting from the use of an elliptically-shaped aperture is the misdirection of glass between the bared fiber sections 76', 77' during the tube collapse process. That is, as the wall of the tube aperture collapses onto fibers 76', 77', some of the tube glass can flow (arrows 84) into at least a portion of the space between those fibers. This tendency is greater in an aperture of elliptical cross-section than in one of circular cross-section since the walls of the former aperture adjacent arrows 84 are closer to the region between the fibers. The flow of tube glass into the region between the fibers causes a decrease in coupled power in the resultant coupler. Since the extent of this glass flow to the region between the fibers varies from coupler, reproducibility is adversely affected. That is, stretching a coupler midregion a given amount will not necessarily result in a given amount of coupling.

An aperture having flattened walls and a symmetrical cross-section is preferred in order to provide good hole closure and good fiber-to-fiber contact within the collapsed region of the tube. By flattened walls is meant walls that are substantially flat but which can vary from perfectly flat due to sagging caused by high temperature processing. During the tube collapse step, apertures having flattened wall surfaces formed in accordance with the teachings of the present invention initially urge the fibers toward each other until mutual contact is achieved. The glass then flows around the fibers but not between them. This causes the fibers to remain in mutual contact along the predetermined length of the collapse region. The fibers are also maintained substantially linear in the coupling region, a factor which aids the retention of the polarization of an optical signal coupled by the fiber.

In FIG. 12, fiber coatings 78' and 79' could be situated within a square aperture in the manner shown, or those coatings could be orthogonally disposed within the aperture as represented by dashed lines 90 and 91. When the fibers are threaded into the aperture, care can be taken to ensure that the fiber claddings at both ends of the tube are oriented in the same direction with respect to aperture 92.

Proper orientation of two coated fibers is facilitated by employing diamond-shaped aperture 93 of FIG. 13 wherein there is insufficient space available for the fibers to be oriented orthogonally with respect to the illustrated orientation. This shape is therefore preferred for couplers having two fibers.

When more than two fibers are employed, the aperture cross-section is preferably an equiangular polygon. Aperture 92 of FIG. 12, for example, could also be used with four or five fibers. If four fibers were employed, the coating diameters would have to be smaller than that illustrated in FIG. 12, and one coated fiber would be located in each corner. If five fibers were employed, one would be located in each corner, and one would be centrally disposed.

Figure 14:
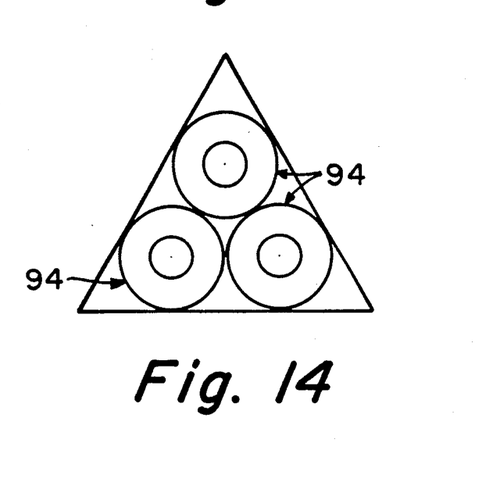

A triangular aperture could best be used to make couplers having three fibers (FIG. 14) or four fibers (FIG. 15). In FIG. 14, a coated fiber 94 is situated at each vertex of aperture 95. FIG. 15 shows a coated fiber 96 situated at each of the three vertices of aperture 98, a coated fiber 97 being centrally disposed.

A pentagon-shaped aperture (not shown) would be suitable for five or six fibers. Apertures shaped like other regular polygons could be used to precisely position other fiber arrangements.

A "star coupler" can be formed by initially providing a capillary tube having a polygon-shaped aperture into which coated fibers are supported in each vertex, an additional coated fiber being centrally disposed (as shown in FIG. 15). In this embodiment the aperture has n flattened surfaces (n is at least 3), and n+1 optical fibers are disposed in the aperture; n fibers contact the aperture, and one fiber is centrally disposed in the aperture in contact with the n fibers. The function of such a coupler is to couple equal amounts of power between the central fiber and the remaining fibers. In order to obtain such a power distribution, the central fiber must be symmetrically disposed with respect to the remaining fibers. FIG. 15 illustrates that such a symmetrical arrangement of fibers is obtained. Since the aperture cross-section is shaped as a regular polygon, coated fibers 96 are equally spaced around coated fiber 97. After the midregion of the tube has collapsed about the fibers, the outer fibers remain substantially equally spaced about the central fiber since the fibers are in tension during the collapse step.

Following are modifications to the above-described tube collapse and draw steps. Midregion 67 could be heated by means of a conventional single-flame burner, in which case the tube should be rotated with respect to the flame to provide uniform heating. If the collapse and stretch operations are performed in the same apparatus, it is preferred that tube 10 be allowed to cool prior to being reheated for the stretch step. This temporal separation of the two steps results in better process control and therefore better reproducibility. The burner may traverse midregion 67 during the tube collapse step and/or the stretch step, but it is preferred that it remain stationary with respect to the tube during these operations. During the tube collapse step, the vacuum source could be attached to only one tube end, in which case a traversing burner should traverse the tube toward the evacuated end of the tube. During the step of drawing the preform midregion, stage 65 could be moved at a different velocity than stage 66 and in the same direction as stage 66. Furthermore, tube 10 can be disposed in any orientation including vertical and horizontal during the tube collapse and/or drawing operations.

The following specific example utilizes glass capillary tubes formed in accordance with the following method. Glass particulate material was applied to a cylindrical mandrel, consolidated, drawn, and dried in accordance with the teachings of U.S. Pat. Nos. Re. 28,029, 3,884,550, 4,125,388 and 4,286,978, all of which are hereby expressly incorporated herein by reference. More specifically, the particulate material was deposited on a mandrel to form a porous, cylindrically-shaped preform. The mandrel was removed and the porous preform was consolidated to form a tubular glass body which was heated and redrawn to an outside diameter of about 2.8 to 3 mm. One end of the resultant capillary tube was attached to a source of air pressure, and while the tube was rotated, a flame was directed onto the tube at spaced intervals. The air pressure within the tube caused a bubble to be formed at each region of the tube softened by the flame. The tube was scored at the center of each bubble and then severed at each score line to produce a capillary tube having tapered apertures at each end thereof. U.S. Pat. No. 4,750,926, which teaches a method of producing apertures of non-circular cross-section is incorporated herein by reference. The method disclosed in that patent teaches shrinking the tube onto a carbon mandrel of desired cross-section and then burning out the mandrel.

Employing the apparatus of FIGS. 2 and 5, the following steps performed in order to fabricate a single-mode 3 dB coupler. Reference will also be made to the coupler preform of FIGS. 3 and 4. Two lengths 22 and 24 of coated single-mode optical fiber were severed from a reel of fiber. The optical fibers had a diameter of 125 $\mu$m, and the diameter of the coated fiber was 160 $\mu$m. The length of each piece of fiber was about 2 meters. The ends of the fibers were secured by clamps 30 and 31, and the fibers were wiped with a lintless cloth dampened with ethyl alcohol.

Capillary tube 10 had an outside diameter of about 2.8 mm and a length of about 4.12 cm. The longitudinal aperture was diamond-shaped, each side of the diamond having a length of about 310 $\mu$m. Tube 10 was formed of a borosilicate glass containing approximately 8 wt. % $B_2O_3$. The minimum cross-sectional dimension of the diamond-shaped aperture was just large enough to accept the coated portions of the optical fibers in the manner illustrated in FIG. 4. A small amount of ethyl alcohol was squirted into the capillary tube which was then threaded onto the fibers and moved to approximately the position shown in FIG. 2. The fibers were pulled slightly and the remaining ends thereof were clamped. A section of coating about 3.2 cm (1.25 inch) long was removed from each fiber at a location thereon between tube 10 and block 39. The length of the stripped section of fiber was slightly shorter than the length of the capillary tube aperture. The two fibers were again wiped with a lintless cloth that had been dampened with ethyl alcohol to remove loose material generated by the coating stripping step. The fibers were placed into grooves 35 and 38; they were then retensioned and restrained by clamps 44 and 45.

Tube 10 was centered over the stripped region as shown in FIG. 3 and the fibers were tacked to the ends of the tube as described above using Dymax 911 UV curable adhesive. A small amount 47 of the adhesive was carefully applied to one side of fibers 22 and 24 at each end of the tube to ensure the presence of openings 48 and 50. The adhesive was exposed to a Dymax PC-3 UV light source for thirty seconds at each end of the tube. The fiber pigtails extending from the coupler preform were color coded. At this time the fibers within the capillary tube were visually checked for twists. Also, a beam of HeNe laser light was launched into that end of fiber 22 protruding from clamp 44. The radiation of light from the remaining end of that fiber indicated that no partial twist was present. An orientation mark was placed on the upper surface of tube 10.

Coupler preform 51 was inserted through ring burner 54. With the orientation mark facing the operator, the ends of the preform were secured in chucks 52 and 53. Vacuum attachments 56 and 61 were attached to the preform ends as shown in FIG. 5. Jaws 59 were clamped on tubing 58 to apply a vacuum to the lower portion of coupler preform 51 while the upper end of the preform was vented. This "air wash" was continued for approximately thirty seconds. Jaws 64 were then clamped against tubing 63 to apply to the upper portion of preform 51 a vacuum that was allowed to stabilize at approximately 53 cm (21 inches) of Hg.

The ring burner was turned on for about 25 seconds to increase the temperature of the midregion of the tube to the softening temperature of the borosilicate glass. This caused tube to collapse onto the fibers along a section of the tube about 0.6 cm long. After the coupler preform cooled for about 30 seconds, the flame was reignited, and the collapsed region was reheated for about 16 seconds. Stages 65 and 66 moved in opposite directions to increase the coupler length by about 1.1 cm. All of the process steps performed in the tube collapse step and the stretch step were performed under the control of a PDP 11-73 micro-computer.

After the coupler had cooled, the vacuum lines were removed from the coupler, and a drop of Dymax 304 adhesive was applied to each end of the capillary tube. The end regions of the tube through which the unclosed portions of the aperture extend were heated to drive out air, and the adhesive was drawn into the ends of the aperture when the tube cooled. After the adhesive was exposed to UV light for 30 seconds, the coupler was removed from the draw.

This process typically produced 3 dB couplers that operated at a predetermined wavelength such as 1300 nm. Median excess device loss was about 0.3 dB, and the lowest measured loss was 0.01 dB.

I claim:

1. A method of making a fiber optic coupler comprising the steps of providing a glass tube having first and second opposite end portions and a midregion, a longitudinal aperture extending from a first end of said tube to a second end thereof, said aperture being formed of n flat-surfaces, wherein n is at least 3, the cross-sectional configuration of said aperture being symmetrical about a plane through the longitudinal axis of said tube, disposing within said longitudinal aperture att least two glass optical fibers, each having a core and cladding, said fibers extending beyond each of said ends of said tube, holding said fibers taut to effect a tension therein, heating the midregion of said tube to collapse said midregion around said fibers, and drawing at least a portion of said midregion.

2. The method of claim 1 wherein the steps of heating and drawing comprises heating the midregion of said tube to at least the softening point of the material thereof to collapse the midregion of said tube around said fibers, thereby forming a solid midregion, and thereafter heating at least a portion of said solid midregion to at least the softening points of the materials of said glass fibers and said tube and drawing at least a portion of said midregion.

3. The method of claim 1 wherein the step of holding said fibers taut comprises securing one end of each of said fibers that extend from the first end of said tube, pulling the remaining ends of said fibers that extend from the second end of said tube to apply a tension to said fibers, and securing said remaining ends of said fibers.

4. The method of claim 1 wherein said glass fibers have coatings thereon, said method further comprising the step of stripping from each fiber a portion of the coating intermediate the ends thereof, the lengths of said fibers from which coatings have been stripped being shorter than the length of said aperture, and disposing the uncoated portions of said fibers within said longitudinal aperture such that the coated portions of said fibers contact the end regions of said aperture, the uncoated portion of each fiber being centrally disposed and the fibers being thereby precisely positioned.

5. The method of claim 4 wherein the step of providing a glass tube comprises providing a tube having enlarged tapered apertures in said end portions for providing access to said longitudinal aperture from the ends of said tube, and wherein the step of holding said fibers taut comprises applying glue to said fibers to secure them to said first end portion of said tube, applying tension to said optical fibers within said longitudinal aperture, and applying glue to said fibers to secure them to said second end portion of said tube, said glue being applied to only one side of said fibers so that said aperture is not blocked thereby, said tapered apertures facilitating the gluing of said fibers to said end portions without eliminating access to said longitudinal aperture.

6. The method of claim 5 further comprising the step of heating said tube at the uncollapsed portions of said aperture and applying glue to the ends of said tube aperture so that said glue is drawn into said aperture and onto the stripped portions of said fibers as said tube cools.

7. The method of claim 1 wherein the step of disposing at least two glass glass optical fibers comprises disposing n+1 optical fibers in said aperture, n of said fibers contacting said aperture and one of said fibers being centrally disposed in said aperture in contact with said n fibers.

8. The method of claim 1 wherein the step of providing a tube comprises providing a tube wherein said aperture has a four sided diamond shaped cross-section with two equal internal angles.

9. The method of claim 1 wherein the step of providing a tube comprises providing a tube wherein the cross-sectional configuration of said aperture is that of an equiangular regular polygon.

10. The method of claim 9 wherein the step of providing a tube comprises providing a tube wherein said aperture has a square-shaped cross-section.

* * * * *